(12) United States Patent
Bach et al.

(10) Patent No.: US 12,163,564 B2
(45) Date of Patent: Dec. 10, 2024

(54) MULTIPLE DISK BRAKE FOR A ROTATABLE ELEMENT

(71) Applicant: Continental Teves AG & Co. oHG, Frankfurt am Main (DE)

(72) Inventors: Uwe Bach, Frankfurt am Main (DE); Matthias Schulitz, Frankfurt am Main (DE); Thomas Stahl, Frankfurt am Main (DE); Phil Lohfink, Frankfurt am Main (DE); Martin Gädke, Frankfurt am Main (DE); Adrian Messner, Frankfurt am Main (DE); Ahmed Sefo, Frankfurt am Main (DE); Jens Hoffmann, Frankfurt am Main (DE)

(73) Assignee: CONTINENTAL AUTOMOTIVE TECHNOLOGIES GMBH, Hanover (DE)

( * ) Notice: Subject to any disclaimer, the term of this patent is extended or adjusted under 35 U.S.C. 154(b) by 337 days.

(21) Appl. No.: 17/621,418

(22) PCT Filed: Jun. 25, 2020

(86) PCT No.: PCT/EP2020/067941
§ 371 (c)(1),
(2) Date: Dec. 21, 2021

(87) PCT Pub. No.: WO2020/260528
PCT Pub. Date: Dec. 30, 2020

(65) Prior Publication Data
US 2022/0356923 A1    Nov. 10, 2022

(30) Foreign Application Priority Data
Jun. 28, 2019 (DE) .................... 10 2019 209 529.1

(51) Int. Cl.
*F16D 66/00* (2006.01)
*F16D 55/36* (2006.01)
(Continued)

(52) U.S. Cl.
CPC ............. *F16D 66/00* (2013.01); *F16D 55/36* (2013.01); *B60T 8/17* (2013.01); *F16D 2065/785* (2013.01); *F16D 2066/003* (2013.01)

(58) Field of Classification Search
CPC .......... F16D 55/36; F16D 59/02; F16D 13/52; F16D 2121/20; F16D 13/683;
(Continued)

(56) References Cited

U.S. PATENT DOCUMENTS

| 4,542,944 A | 9/1985 | Lyons |
| 6,145,635 A | 11/2000 | White |

(Continued)

FOREIGN PATENT DOCUMENTS

| CA | 2276514 A1 | 7/1998 |
| CN | 102119288 A | 7/2011 |

(Continued)

OTHER PUBLICATIONS

Office Action (The Second Office Action) issued Dec. 14, 2023, by the State Intellectual Property Office of People's Republic of China in corresponding Chinese Patent Application No. 202080046593.9 and an English translation of the Office Action. (11 pages).

(Continued)

*Primary Examiner* — Robert A. Siconolfi
*Assistant Examiner* — Mahbubur Rashid
(74) *Attorney, Agent, or Firm* — Buchanan Ingersoll & Rooney PC

(57) ABSTRACT

An interconnected multiple disk brake for a rotatable element with an integrated sensor which is based on the rotation of a sensor disk.

20 Claims, 2 Drawing Sheets

(51) Int. Cl.
*B60T 8/17* (2006.01)
*F16D 65/78* (2006.01)

(58) Field of Classification Search
CPC .. F16D 2066/003; F16D 13/648; F16D 55/24; F16D 66/00; F16D 2055/0037; F16D 2055/0041; F16D 2051/005; F16D 2065/785; B60T 8/17
See application file for complete search history.

(56) References Cited

U.S. PATENT DOCUMENTS

| | | |
|---|---|---|
| 8,220,599 B2 | 7/2012 | Fischer |
| 9,127,735 B2 | 9/2015 | Putz et al. |
| 9,168,905 B2 | 10/2015 | Welin |
| 9,453,545 B2 | 9/2016 | Jungmann et al. |
| 9,816,575 B2 | 11/2017 | Falter et al. |
| 10,670,098 B2 | 6/2020 | John et al. |
| 10,876,586 B2 | 12/2020 | Jungmann et al. |
| 10,894,533 B2 | 1/2021 | Steele et al. |
| 2008/0283346 A1 | 11/2008 | Ralea |
| 2010/0252368 A1 | 10/2010 | Fischer |

FOREIGN PATENT DOCUMENTS

| | | | |
|---|---|---|---|
| CN | 102428292 | A | 4/2012 |
| CN | 102803780 | A | 11/2012 |
| CN | 107850157 | A | 3/2018 |
| CN | 107923459 | A | 4/2018 |
| CN | 108603549 | A | 9/2018 |
| CN | 208476449 | U | 2/2019 |
| CN | 111479729 | A | 7/2020 |
| DE | 60123010 | T2 | 4/2007 |
| DE | 102010028075 | A1 | 10/2011 |
| DE | 102012012474 | A1 | 12/2013 |
| DE | 102012223104 | A1 | 6/2014 |
| EP | 1234993 | B1 | 8/2002 |
| EP | 1695883 | A1 | 8/2006 |
| EP | 2219984 | B1 * | 8/2011 |
| EP | 5651357 | B2 * | 1/2015 |
| EP | 3418135 | A1 | 12/2018 |
| GB | 2226292 | A | 6/1990 |
| JP | 52100676 | A | 8/1977 |
| JP | 2008127205 | A | 6/2008 |
| JP | 2012503162 | A | 2/2012 |
| JP | 2016519266 | A | 6/2016 |
| JP | 2019098839 | A | 6/2019 |
| JP | 2019100506 | A | 6/2019 |
| JP | 2019108916 | A | 7/2019 |

OTHER PUBLICATIONS

Chinese Office Action for Chinese Application No. 202080046593.9, dated Apr. 22, 2023 with translation, 8 pages.
"Brake Technology Handbook," edited by Bert Breuer and Karlheinz H. Bill, 2006, excerpt with English Translation. 18 pages.
International Search Report and Written Opinion for International Application No. PCT/EP2020/067941, mailed Oct. 13, 2020, with partial translation, 7 pages.
German Examination Report for German Application No. 10 2019 209 529.1, mailed Mar. 18, 2020, with translation, 7 pages.
Japanese Notice of Reasons for Refusal for Japanese Application No. 2021-574789, dated Feb. 6, 2023 with translation, 8 pages.
Office Action (The Third Office Action) issued May 6, 2024, by the State Intellectual Property Office of People's Republic of China in corresponding Chinese Patent Application No. 202080046593.9 and an English translation of the Office Action. (15 pages).
Office Action issued Apr. 15, 2024, by the Brazil Patent Office in corresponding Brazilian Patent Application No. BR112021024863-3 and an English translation of the Office Action. (5 pages).

* cited by examiner

MULTIPLE DISK BRAKE FOR A ROTATABLE ELEMENT

CROSS REFERENCE TO RELATED APPLICATIONS

This application is the U.S. National Phase Application of PCT International Application No. PCT/EP2020/067941, filed Jun. 25, 2020, which claims priority to German Patent Application No. 10 2019 209 529.1, filed Jun. 28, 2019, the contents of such applications being incorporated by reference herein.

FIELD OF THE INVENTION

The invention relates to a multiple disk brake for a rotatable element.

BACKGROUND OF THE INVENTION

For example, the prior art "Bremsenhandbuch" ("Brake Technology Handbook"), ISBN 10 3-8348-0064-3, third Edition, 2006, Chapter 12.3.3, incorporated herein by reference, describes oil bath wet-running full disk brakes of multiple-disk design in a configuration requiring no maintenance over the service life, which are suitable as heavy-duty service brakes or parking and auxiliary brakes for heavy-duty utility vehicles, such as in particular agricultural tractors, harvesting machines, forest machinery and construction machinery, i.e., for off-road operation. In utility vehicles of this kind, air brake devices have gained wide acceptance and their parking brake is usually designed as a spring-loaded brake. The cylinders of a prestressed spring-loaded brake actuate a brake application position when there is no air pressure or only inadequate air pressure present. It is always ensured that the utility vehicle is fundamentally braked by the prestressed spring mechanism actuators even in the event of a fault when there is an energy failure or energy drop.

SUMMARY OF THE INVENTION

An aspect of the present invention in a further development of the prior art addresses the problem of providing a multiple disk brake that can be adjusted in a particularly finely metered manner which is further developed in comparison to known heavy-duty multiple disk brakes of utility vehicles in such a way that it can consequently be used, for example in respect of a convenient monitoring and/or open-loop or closed-loop control of the multiple disk brake, as a service and/or parking brake for use in light passenger vehicles or what are known as people-movers, so that the multiple disk brake can be implemented in a targeted manner for the purpose of cooperation in a modern and possibly regeneratively functioning passenger vehicle drivetrain.

The present problem is solved in accordance with the invention by a novel multiple disk brake by way of the combination of features, which additionally integrates novel sensor means so that the multiple disk brake according to the invention is made possible as the result of a particularly precise target-actual value control. The disclosed content of the entire application documents including the claims is incorporated into the subject matter of this description by express reference.

An aspect of the invention relates to a multiple disk brake, inclusive of sensor system for a rotatable element, which is arranged in an electronically interconnected, controlled vehicle system, is controllable electrically and/or electronically in open-loop or closed-loop fashion by an electronic control unit ECU and is interconnected by a bus system. Said electronic vehicle system is suitable and intended here to suitably interconnect, in a superordinate manner to a certain extent, both drivetrain functions of an electronic drivetrain control under prioritized consideration of the driving safety functions of an electronic stability control or brake control with the regeneratively mounted rationalization functions and also efficiency functions. The interconnected multiple disk brake correspondingly arranged regeneratively in a superordinate fashion has, for this purpose, a suitable electronically externally-controllable application actuator system, and at least mechanical and electrical component interfaces which are separate from one another are also provided, wherein these are often provided as separate component interfaces which comprise one or more electrical sensor interfaces.

The electrically interconnected multiple disk brake has a basic structure which functions as non-rotationally mounted stator. In a preferred embodiment of the invention, the stator is fixed exchangeably, that is to say releasably, to one or more mechanical interfaces on a vehicle component, such as in particular on a drivetrain component, an underbody component, a structural chassis component or on a vehicle frame. Such a stator basic structure can be, for example, in the form of a housing part of the multiple disk brake joined to a motor or transmission housing separately or in an integrated fashion, which housing part consequently represents a static reference or bearing in respect of relative movement, such as a rotary movement and/or axial displacements of a rotatable element to be braked.

The electrically interconnected multiple disk brake has a number of primary disks, which are connected to the rotatable element for conjoint rotation and are rotatable relative to the basic structure. A rotary movement between the rotatable element and the primary disks can thus be transferred, whereby, for example, a rotary movement of the rotatable element is transferred to the primary disks or a braking effect which acts on the primary disks is transferred to the rotatable element.

The rotatable element can be, in particular, a shaft which is used within the scope of a drive system. The rotatable element is rotatable relative to the basic structure.

The multiple disk brake has a number of intermediate disks, which are each mounted on the basic structure between the primary disks fixedly or rotatably to a limited extent. This means, in particular, that the various intermediate disks cannot rotate at all or can only rotate to a limited extent in comparison to the basic structure. With appropriate friction with the primary disks, the intermediate disks can thus exert a braking effect on the primary disks. Also in the case of a mounting that is fixed or rotatable to a limited extent, an axial displaceability is typically provided in order to allow the braking effect.

The multiple disk brake arranged interconnected in the electrical vehicle system has an application element which is configured to press the primary disks against the intermediate disks in order to apply the multiple disk brake. In this case, the application element can be, in particular, an electrical or electromagnetic application element, wherein an appropriate effect can be achieved, for example, by energizing an electromagnet.

The multiple disk brake has at least one restoring unit, which is configured to prestress at least one sensor disk of the intermediate disks mounted rotatably to a limited extent in respect of its rotary movement into an idle position relative to the basic structure. The restoring unit can act here, for example, only on one of the intermediate disks or on a plurality of intermediate disks. The intermediate disks correspondingly provided with a restoring unit are typically referred to here as sensor disks, since they can exert a sensor function, as will be described in greater detail further below.

The multiple disk brake also has a sensor which is designed to detect a rotation of the sensor disk from its idle position. For the purpose of appropriate electronic integration, such as in particular for the purpose of interconnection with the electronic vehicle system, such as in particular for addressing in the vehicle databus system, an electronic sensor interface is assigned to said sensor.

By means of the multiple disk brake according to an aspect of the invention, it is possible to detect and to quantify by means of the sensor a braking force applied by the multiple disk brake to the rotatable element. This allows advantageous monitoring of the braking effect.

By way of the restoring unit, in particular a force can be exerted onto the sensor disk which is dependent on the rotation of the particular sensor disk relative to the basic structure. The effective force can thus be determined from a rotation of the sensor disk out of the particular idle position.

According to a preferred embodiment, the restoring unit is designed as a spring element. This corresponds to a simple and feasible embodiment.

The restoring unit can be fixedly connected to the sensor disk. However, it can also be fixedly connected to the basic structure.

The sensor disk can, in particular, be connected to the sensor by means of a pointer, wherein the pointer protrudes from the sensor disk. A certain decoupling between sensor disk and sensor can thus be achieved, whereby, for example, an axial play can be provided.

The pointer can be connected to the sensor disk fixedly or so as to be displaceable in a radial direction. By means of a radial displaceability, a certain play can likewise be provided, whereby the operation can be simplified and it is possible to respond to any changes in a simple way.

The pointer can be designed in particular to be thermally insulating. A thermal decoupling is thus achieved.

The sensor can have a radially dimensionally stable, tangentially elastic element, in which the pointer engages. Such a radially dimensionally stable, tangentially elastic element has proven to be advantageous for realizing a sensor in a simple and reliable fashion.

The elastic element can be a corrugated bellows, in particular.

The sensor can have a merely tangentially displaceably mounted element, in which the pointer engages. An advantageous embodiment of a sensor can thus also be realized. The tangentially displaceably mounted element can be connected to the basic structure by means of an elastic sealing means. An infiltration of moisture or soiling into the multiple disk brake can thus be avoided.

The pointer can be axially displaceable or can have axial play in the tangentially elastic element or in the tangentially displaceably mounted element. An axial displacement of the particular sensor disk typically necessary for achieving a braking effect can thus be made possible without consequences for the sensor.

The restoring unit can be fixedly connected to the basic structure and can be designed as part of the sensor. In this case, the restoring unit can be designed in particular as a spring element. For example, a magnet can be fastened on the spring element, wherein this is typically not fastened on the particular sensor disk. A relative movement between the magnet and, for example, a magnet sensor arrangement can thus be measured. The spring element can be embodied, for example, similarly to a bending beam or a leaf spring. A relative movement between sensor disk and basic structure is typically provided in order to allow an axial movability of the sensor disk without jamming. The play necessary for this is tolerance-dependent. In the arrangement just described, the sensor signal is typically independent of this play, i.e. does not lead to an offset error.

The sensor can have, for example, a magnet detector arrangement in order to detect a deformation of the tangentially elastic element or a displacement of the tangentially displaceably mounted element or a deformation of the restoring unit. By means of such a magnet detector arrangement, a rotation of the particular sensor disk about its idle position, which is indicative for the effective force, can be measured advantageously.

The magnet detector arrangement can be or can comprise in particular a detector device based on the anisotropic magnetoresistive effect, AMR. This has proven to be advantageous for typical applications.

The rotatable element can be, in particular, a shaft, for example a typical driveshaft, which is used in a drivetrain, or can also be a wheel shaft, on which a wheel of a motor vehicle is directly mounted. The braking effect acts here typically on the particular rotatable element. The rotatable element can be part of the multiple disk brake, but can also be considered to be external thereto.

By means of the embodiment described herein, in particular a braking torque can be detected via an intermediate plate or sensor plate, in particular without coating material, which for example indicates a certain resilience in the tangential movement direction in a specific region and thus generates a measurable distance during the braking process.

BRIEF DESCRIPTION OF THE DRAWINGS

Further features and advantages will be found by a person skilled in the art from the exemplary embodiments described below with reference to the appended drawing. In the drawing.

DETAILED DESCRIPTION OF THE PREFERRED EMBODIMENTS

Figure 1:
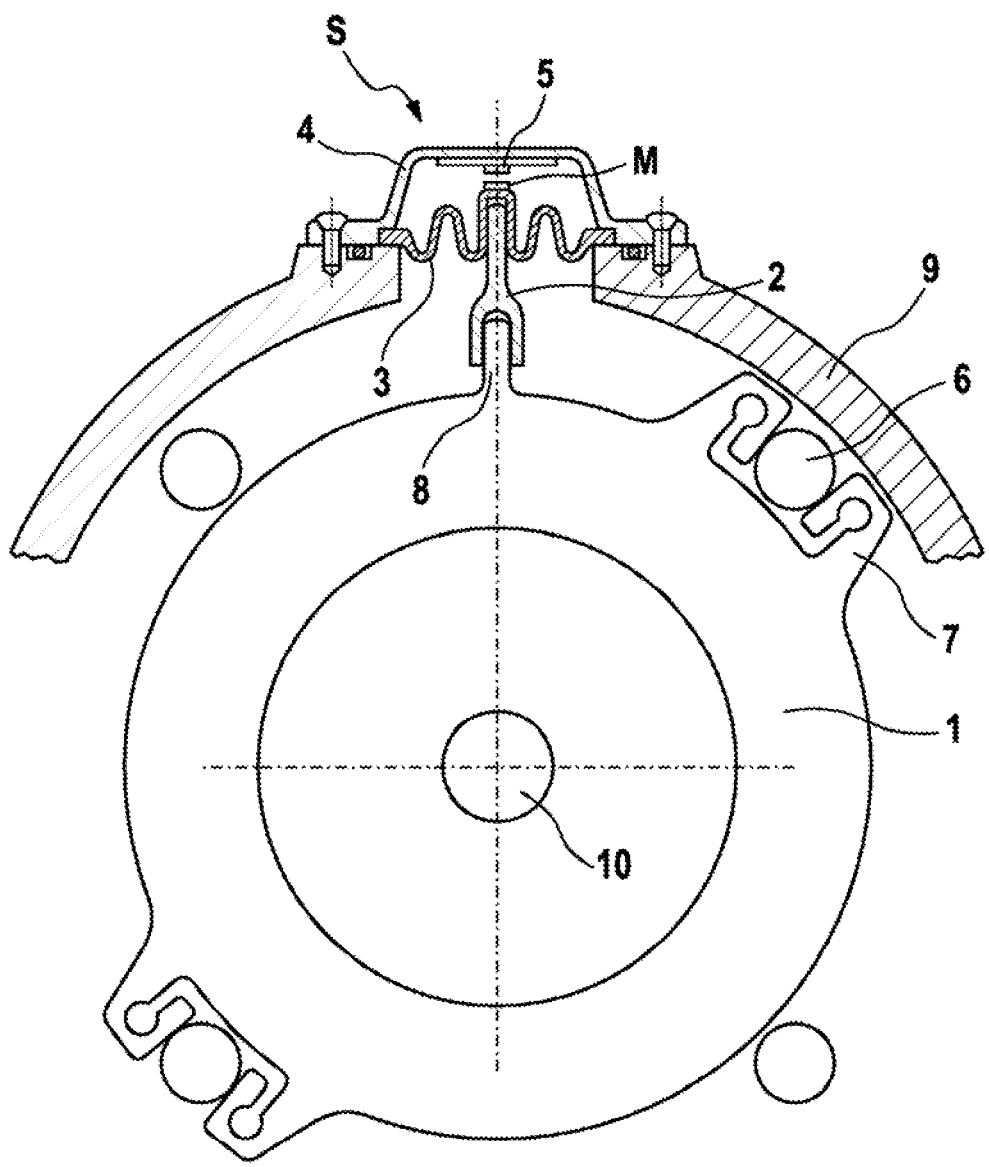
FIG. 1: shows a detail of a multiple disk brake.

FIG. 1 shows a detail of a multiple disk brake LB according to an exemplary embodiment of the invention.

In this case an intermediate disk 1 is shown, which is formed in the present case as a sensor disk. The intermediate disk 1 is mounted so as to be rotatable to a limited extent relative to a basic structure 9, which represents a housing of the disk brake LB.

The disk brake LB has a rotatable element 10 in the form of a shaft. The rotatable element 10 is connected for conjoint rotation to primary disks, not shown. A braking effect on the rotatable element 10 can thus be achieved by pressing the primary disks against the sensor disk 1 or other intermediate disks.

The multiple disk brake LB has a number of rods 6, which are fixedly connected to the basic structure 9. It also has spring elements 7, which are fixedly connected to the sensor disk 1 and which, as shown, bear against a particular rod 6. The intermediate disk 1 is thus mounted so as to be rotatable to a limited extent relative to the basic structure 9, wherein the spring elements 7 ensure a restoring force into an idle position. They thus serve as a restoring unit.

A projection 8 is arranged on the outer circumference of the intermediate disk 1, on which projection there is mounted a pointer 2. This pointer 2 can also be referred to as a finger. As shown, it is radially displaceable on the projection 8. Temperature peaks and corresponding radial expansions can thus be decoupled. In an alternative embodiment, the pointer 2 could also be integrated in one part into the intermediate disk 1. The pointer 2 transmits a tangential movement of the intermediate disk 1 to a sensor S of the multiple disk brake LB, which will be described in greater detail hereinafter.

The pointer 2 can also be formed as an insulation element.

The sensor S has a corrugated bellows 3, which in the present case is designed as a radially dimensionally stable, tangentially elastic element. The pointer 2 engages in this corrugated bellows 3 and thus transmits a tangential movement from the sensor disk 1 to the corrugated bellows 3. A magnet M is disposed on the corrugated bellows 3, which is dimensionally stable in the radial direction, and thus moves with the corrugated bellows 3 as the pointer 2 moves.

The sensor S also has a magnet detector arrangement 5, which is based on the anisotropic magnetoresistive effect. The magnet detector arrangement 5 is arranged here in the present case in a cover 4 of the sensor S, on an inner side. An at least largely equal air gap between magnet detector arrangement 5 and magnet M is typically obtained here. A displacement of the magnet M, which is based on a rotation of the sensor disk 1 from its idle position, can thus be identified and measured by means of the magnet detector arrangement 5.

In this way, a relative movement when a torque is applied to the intermediate disk 1 can be detected in the sensor S. This allows a conclusion to be drawn regarding the effective braking force.

Figure 2:
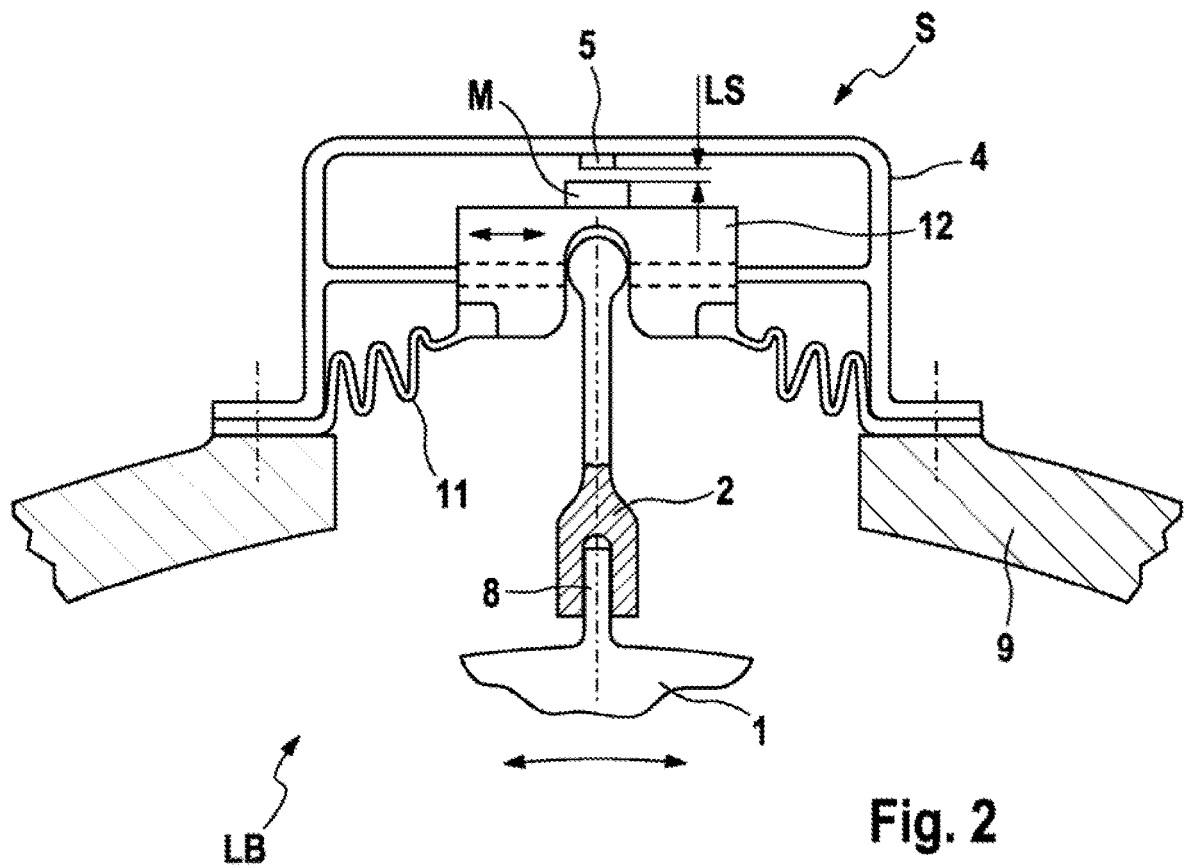
FIG. 2: shows a further detail of a multiple disk brake.

FIG. 2 shows a detail of a multiple disk brake LB according to a second exemplary embodiment. In this case, the sensor S is embodied in an alternative way.

The magnet M is disposed here on a slide 12, which is mounted in the cover 4 so as to be displaceable only linearly, specifically tangentially. This corresponds to a drawer runner. For sealing, a flexible elastomer element is provided as a sealing means 11 between the slide 12 and housing 9. However, in this case, it does not satisfy any positioning requirements for the uniform axial spacing of the magnetic elements. Rather, an indicated air gap LS is ensured here by a guidance of the slide 12 in the cover 4, as shown.

Figure 3:
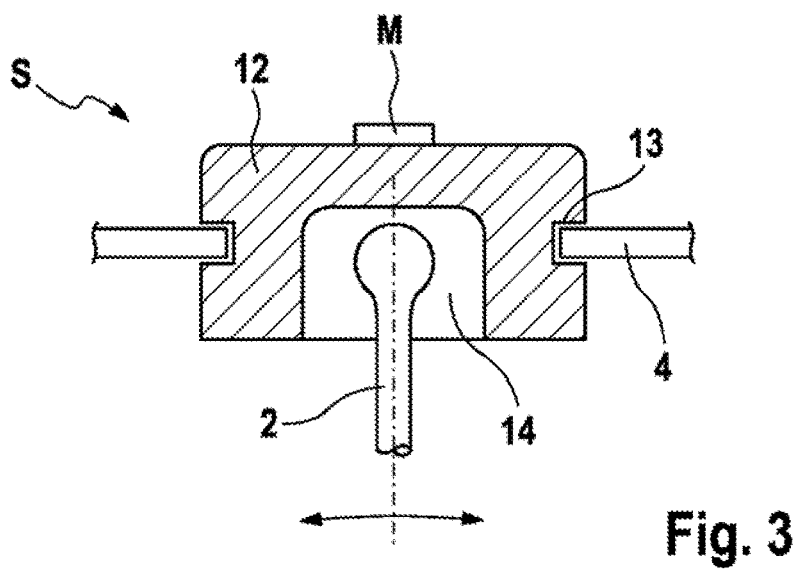
FIG. 3: shows a detailed view.

FIG. 3 shows an enlarged detail of a possible embodiment of part of the sensor S. This can be used, for example, in the embodiment according to FIG. 2.

The slide 12, which can also be referred to as a sliding block, has a bore 13, through which a rod-shaped part of the cover 4 passes. A linear guidance is thus ensured.

A clearance 14 is provided between the slide 12 and the pointer 2, whereby in particular an axial displacement of the intermediate disk 1 can be taken into consideration. Reliability and service life are thus further increased.

A deliberate resilience in the tangential direction of the intermediate disk 1 can be realized alternatively, for example, also via separate spring elements, for example combined with a disk or pin component.

It should be mentioned that a spring element can be shaped arbitrarily in principle and can be mounted on the intermediate disk 1, as shown, or alternatively also on another element, such as on one of the rods 6 or on the basic structure 9, for example. The pointer 2 can advantageously be formed from a thermally insulating material. As a result, a thermal decoupling can be achieved. The intermediate disk 1 can also be formed from different materials.

Alternatively, the corrugated bellows 3 can also have other resilient, encapsulating contours. Alternatively to the magnet detector arrangement 5, which is based on the anisotropic magnetoresistive effect, other position sensors can also be used.

The intermediate disk 1, which is formed as a sensor disk, can be installed in a disk stack of the multiple disk brake LB in any position. A plurality of such intermediate disks 1 can also be formed as corresponding sensor disks.

A uniform air gap LS of the sensor S can be achieved via a sliding element in a guide. In the event of wear, axial movements of the intermediate disks 1 can be compensated for by corresponding recesses in the slide 12, without this influencing the measurement. On the whole, an economical and precise sensor with a low spatial requirement is provided by the described embodiment. The sensor S can be encapsulated here, in particular as shown, which allows a particularly high reliability.

It is pointed out that features may be described in combination in the claims and in the description, for example to facilitate understanding, although these may also be used separately from each other. The person skilled in the art will gather that such features may also be combined with other features or feature combinations independently of each other.

Dependency references in the dependent claims may characterize preferred combinations of the respective features but do not exclude other feature combinations.

LIST OF REFERENCE SIGNS

LB: multiple disk brake
M: magnet
1: sensor disk, intermediate disk
2: pointer
3: corrugated bellows
4: cover
5: magnet detector arrangement
6: rod
7: spring element
8: projection
9: stator/basic structure
10: rotatable element
11: sealing means
12: slide
13: bore
14: clearance

The invention claimed is:

1. A multiple disk brake for a rotatable element, comprising:
   a stator;
   a number of primary disks, which are connected to the rotatable element for conjoint rotation and are rotatable relative to the stator;
   a number of intermediate disks, which are each mounted on the stator between the primary disks fixedly or rotatably to a limited extent;
   an application element, which is configured to press the primary disks against the intermediate disks in order to apply the multiple disk brake;
   a restoring unit, which is configured to rotationally prestress, to a limited extent, at least one sensor disk of the intermediate disks with respect to a rotary movement of the at least one sensor disk, and into an idle position relative to the stator; and a sensor, which is designed to detect a rotation of the sensor disk from its idle position.

2. The multiple disk brake as claimed in claim 1, wherein the restoring unit is a spring element.

3. The multiple disk brake as claimed in claim 1, wherein the restoring unit is fixedly connected to the sensor disk, or wherein the restoring unit is fixedly connected to the stator.

4. The multiple disk brake as claimed in claim 1, wherein the sensor disk is connected to the sensor by a pointer, wherein the pointer protrudes from the sensor disk.

5. The multiple disk brake as claimed in claim 4, wherein the pointer is connected to the sensor disk fixedly or so as to be displaceable in a radial direction.

6. The multiple disk brake as claimed in claim 5, wherein the pointer is designed to be thermally insulating.

7. The multiple disk brake as claimed in claim 4, wherein the pointer is designed to be thermally insulating.

8. The multiple disk brake as claimed in claim 1, wherein the restoring unit is fixedly connected to the stator and is designed as part of the sensor.

9. The multiple disk brake as claimed in claim 1, which has a shaft as the rotatable element.

10. The multiple disk brake as claimed in claim 1, wherein the multiple disk brake is provided interconnected with an electronic vehicle system comprising at least one electronic control unit, since an electronic integration with at least one electronic connection between the multiple disk brake and ECU is present, so that an electronic vehicle drivetrain control and an electronic brake system control inclusive of recuperation is made possible with the aid of the superordinate electronic control unit.

11. The multiple disk brake as claimed in claim 1, wherein the multiple disk brake is assigned at least one electronic sensor interface for electronic integration, for the purpose of interconnection with an electronic vehicle system.

12. The multiple disk brake as claimed in claim 1, wherein the restoring unit is formed in a portion of the at least on sensor disk.

13. The multiple disk brake as claimed in claim 1, further comprising at least one rod fixedly coupled to the stator, wherein the restoring unit bears against the rod when the sensor disk is in the idle position.

14. A multiple disk brake for a rotatable element, comprising:

a stator;

a number of primary disks, which are connected to the rotatable element for conjoint rotation and are rotatable relative to the stator;

a number of intermediate disks, which are each mounted on the stator between the primary disks fixedly or rotatably to a limited extent;

an application element, which is configured to press the primary disks against the intermediate disks in order to apply the multiple disk brake;

a restoring unit, which is configured to prestress at least one sensor disk of the intermediate disks mounted rotatably to a limited extent in respect of its rotary movement into an idle position relative to the stator; and a sensor, which is designed to detect a rotation of the sensor disk from its idle position, wherein the sensor disk is connected to the sensor by a pointer, wherein the pointer protrudes from the sensor disk, and wherein the sensor has a radially dimensionally stable, tangentially elastic element, in which the pointer engages.

15. The multiple disk brake as claimed in claim 14, wherein the elastic element is a corrugated bellows.

16. The multiple disk brake as claimed in claim 14, wherein the pointer is axially displaceable or has axial play in the tangentially elastic element or in the tangentially displaceably mounted element.

17. The multiple disk brake as claimed in claim 14, wherein the sensor has a magnet detector arrangement in order to detect a deformation of the tangentially elastic element or a displacement of the tangentially displaceably mounted element or a deformation of the restoring unit.

18. The multiple disk brake as claimed in claim 17, wherein the magnet detector arrangement is or has a detection device based on an anisotropic magnetoresistive (AMR) effect.

19. A multiple disk brake for a rotatable element, comprising:

a stator;

a number of primary disks, which are connected to the rotatable element for conjoint rotation and are rotatable relative to the stator;

a number of intermediate disks, which are each mounted on the stator between the primary disks fixedly or rotatably to a limited extent;

an application element, which is configured to press the primary disks against the intermediate disks in order to apply the multiple disk brake;

a restoring unit, which is configured to prestress at least one sensor disk of the intermediate disks mounted rotatably to a limited extent in respect of its rotary movement into an idle position relative to the stator; and a sensor, which is designed to detect a rotation of the sensor disk from its idle position, wherein the sensor disk is connected to the sensor by a pointer, wherein the pointer protrudes from the sensor disk, and wherein the sensor has a merely tangentially displaceably mounted element, in which the pointer engages.

20. The multiple disk brake as claimed in claim 19, wherein the tangentially displaceably mounted element is connected to the stator by an elastic sealing means.

* * * * *

UNITED STATES PATENT AND TRADEMARK OFFICE
CERTIFICATE OF CORRECTION

PATENT NO. : 12,163,564 B2
APPLICATION NO. : 17/621418
DATED : December 10, 2024
INVENTOR(S) : Uwe Bach et al.

Page 1 of 1

It is certified that error appears in the above-identified patent and that said Letters Patent is hereby corrected as shown below:

In the Claims

In Column 7, Claim 12, Line 45: Change "the at least on" to -- the at least one --.

Signed and Sealed this
Eleventh Day of March, 2025

Coke Morgan Stewart
*Acting Director of the United States Patent and Trademark Office*